United States Patent
Bush et al.

(10) Patent No.: US 11,541,626 B2
(45) Date of Patent: Jan. 3, 2023

(54) MULTI-IMPEDANCE COMPOSITE

(71) Applicant: Zephyros, Inc., Romeo, MI (US)

(72) Inventors: Kendall Bush, Macomb, MI (US); Michael Czaplicki, Rochester Hills, MI (US)

(73) Assignee: Zephyros, Inc., Romeo, MI (US)

( * ) Notice: Subject to any disclaimer, the term of this patent is extended or adjusted under 35 U.S.C. 154(b) by 39 days.

(21) Appl. No.: 15/574,654

(22) PCT Filed: May 20, 2016

(86) PCT No.: PCT/US2016/033500
§ 371 (c)(1),
(2) Date: Nov. 16, 2017

(87) PCT Pub. No.: WO2016/187526
PCT Pub. Date: Nov. 24, 2016

(65) Prior Publication Data
US 2018/0126691 A1 May 10, 2018

Related U.S. Application Data

(60) Provisional application No. 62/164,204, filed on May 20, 2015.

(51) Int. Cl.
*B32B 5/02* (2006.01)
*B32B 5/12* (2006.01)
(Continued)

(52) U.S. Cl.
CPC ............... *B32B 5/022* (2013.01); *B32B 3/00* (2013.01); *B32B 3/26* (2013.01); *B32B 5/00* (2013.01);
(Continued)

(58) Field of Classification Search
CPC .......... B32B 5/022; B32B 5/024; B32B 5/00; B32B 5/26; B32B 5/24; B32B 5/22;
(Continued)

(56) References Cited

U.S. PATENT DOCUMENTS 3,061,491 A  10/1962  Sherrard
3,087,571 A   4/1963  Kerwin, Jr.
(Continued)

FOREIGN PATENT DOCUMENTS

AU        782550 B2    1/2001
AU     2005203796 A1  10/2005
(Continued)

OTHER PUBLICATIONS

International Search Report and Written Opinion for International Application No. PCT/US2016/033500, dated Aug. 5, 2016.
(Continued)

*Primary Examiner* — Michael Zhang
(74) *Attorney, Agent, or Firm* — The Dobrusin Law Firm, P.C.

(57) ABSTRACT

An acoustic composite comprising a plurality of discrete air flow resistive layers layered on top of each other including a top layer and one or more lofted fibrous layers produced by a lapping process, the top layer having a specific air flow resistance that is greater than a specific air flow resistance of the one or more lofted fibrous layer.

20 Claims, 1 Drawing Sheet

(51) Int. Cl.

| | | |
|---|---|---|
| *B32B 5/26* | (2006.01) | |
| *B32B 7/02* | (2019.01) | |
| *B32B 7/10* | (2006.01) | |
| *B32B 15/04* | (2006.01) | |
| *B32B 15/14* | (2006.01) | |
| *B32B 5/22* | (2006.01) | |
| *B32B 15/00* | (2006.01) | |
| *B32B 3/00* | (2006.01) | |
| *B32B 5/24* | (2006.01) | |
| *B32B 27/00* | (2006.01) | |
| *B32B 3/26* | (2006.01) | |
| *B32B 7/00* | (2019.01) | |
| *B32B 27/06* | (2006.01) | |
| *B32B 5/00* | (2006.01) | |
| *B32B 27/12* | (2006.01) | |
| *B32B 7/04* | (2019.01) | |

(52) U.S. Cl.
CPC ............... *B32B 5/02* (2013.01); *B32B 5/024* (2013.01); *B32B 5/12* (2013.01); *B32B 5/22* (2013.01); *B32B 5/24* (2013.01); *B32B 5/26* (2013.01); *B32B 7/00* (2013.01); *B32B 7/02* (2013.01); *B32B 7/04* (2013.01); *B32B 7/10* (2013.01); *B32B 15/00* (2013.01); *B32B 15/04* (2013.01); *B32B 15/14* (2013.01); *B32B 27/00* (2013.01); *B32B 27/06* (2013.01); *B32B 27/12* (2013.01); *B32B 2250/00* (2013.01); *B32B 2250/40* (2013.01); *B32B 2262/00* (2013.01); *B32B 2307/10* (2013.01); *B32B 2307/102* (2013.01); *B32B 2307/56* (2013.01); *B32B 2307/724* (2013.01); *B32B 2605/00* (2013.01); *B32B 2605/003* (2013.01); *B32B 2605/08* (2013.01); *B32B 2605/12* (2013.01)

(58) Field of Classification Search
CPC .... B32B 5/12; B32B 5/02; B32B 3/26; B32B 3/00; B32B 27/12; B32B 27/06; B32B 27/00; B32B 15/14; B32B 15/04; B32B 15/00; B32B 7/10; B32B 7/04; B32B 7/02; B32B 7/00; B32B 2605/12; B32B 2605/08; B32B 2605/003; B32B 2605/00; B32B 2307/724; B32B 2307/56; B32B 2307/102; B32B 2307/10; B32B 2262/00; B60R 13/08
See application file for complete search history.

(56) References Cited

U.S. PATENT DOCUMENTS

| | | |
|---|---|---|
| 3,160,549 A | 12/1964 | Caldwell et al. |
| 3,193,049 A | 7/1965 | Wollek |
| 3,205,972 A | 9/1965 | Stricker |
| 3,214,323 A | 10/1965 | Russell et al. |
| 3,386,527 A | 6/1968 | Daubert et al. |
| 3,523,859 A | 8/1970 | Komp |
| 3,642,554 A | 2/1972 | Hensley |
| 3,899,380 A | 8/1975 | Pihlstrom |
| 3,977,492 A | 8/1976 | Hankel |
| 3,978,179 A | 8/1976 | Sundhauss |
| 3,994,363 A | 11/1976 | Hirao et al. |
| 4,050,913 A | 9/1977 | Roach |
| 4,096,007 A | 6/1978 | Braunling |
| 4,129,675 A | 12/1978 | Scott |
| 4,131,664 A | 12/1978 | Flowers et al. |
| 4,152,474 A | 5/1979 | Cook et al. |
| 4,287,255 A | 9/1981 | Wong et al. |
| 4,299,223 A | 11/1981 | Cronkrite |
| 4,392,522 A | 7/1983 | Bschorr |
| 4,399,851 A | 8/1983 | Bschorr |
| 4,705,715 A | 11/1987 | DeCoste, Jr. et al. |
| 4,830,140 A | 5/1989 | Fridh et al. |
| 4,888,234 A | 12/1989 | Smith et al. |
| 4,988,551 A | 1/1991 | Zegler |
| 5,004,549 A | 4/1991 | Wood et al. |
| 5,068,001 A | 11/1991 | Huassling |
| 5,128,386 A | 7/1992 | Rehmer et al. |
| 5,298,694 A | 3/1994 | Thompson et al. |
| 5,401,567 A | 3/1995 | Knobloch |
| 5,410,111 A | 4/1995 | Stief et al. |
| 5,459,291 A | 10/1995 | Haines et al. |
| 5,492,580 A | 2/1996 | Frank |
| 5,493,081 A | 2/1996 | Manigold |
| 5,496,603 A | 3/1996 | Riedel et al. |
| 5,504,282 A | 4/1996 | Pizzirusso et al. |
| 5,550,338 A | 8/1996 | Hielscher |
| 5,560,204 A | 10/1996 | Ishihama et al. |
| 5,591,289 A | 1/1997 | Souders et al. |
| 5,613,942 A | 3/1997 | Lucas et al. |
| 5,635,270 A | 6/1997 | Fletcher |
| 5,721,177 A | 2/1998 | Frank |
| 5,733,824 A | 3/1998 | Brunka et al. |
| 5,736,470 A | 4/1998 | Schneberger et al. |
| 5,741,829 A | 4/1998 | Reich et al. |
| 5,745,434 A | 4/1998 | Cushman |
| 5,747,131 A | 5/1998 | Kreckel |
| 5,773,080 A | 6/1998 | Simmons et al. |
| 5,773,375 A | 6/1998 | Swan et al. |
| 5,824,973 A | 10/1998 | Haines et al. |
| 5,832,685 A | 11/1998 | Hermanson |
| 5,841,081 A | 11/1998 | Thompson et al. |
| 5,861,348 A | 1/1999 | Kase |
| 5,866,235 A | 2/1999 | Fredrick et al. |
| 5,886,306 A | 3/1999 | Patel et al. |
| 5,906,883 A | 5/1999 | Blanc-Brude |
| 5,955,174 A | 9/1999 | Wadsworth et al. |
| RE36,323 E | 10/1999 | Thompson et al. |
| 5,968,629 A | 10/1999 | Masui et al. |
| 5,981,411 A | 11/1999 | Brown |
| 6,008,149 A | 12/1999 | Copperwheat |
| 6,048,809 A | 4/2000 | Brow et al. |
| 6,102,465 A | 8/2000 | Nemoto et al. |
| 6,103,180 A | 8/2000 | Haeseker et al. |
| 6,145,617 A | 11/2000 | Alts |
| 6,165,921 A | 12/2000 | Nagata et al. |
| 6,198,016 B1 | 3/2001 | Lucast et al. |
| 6,204,209 B1 | 3/2001 | Rozek et al. |
| 6,220,388 B1 | 4/2001 | Sanborn |
| 6,238,761 B1 | 5/2001 | Jeong et al. |
| 6,244,314 B1 | 6/2001 | Dodt et al. |
| 6,256,600 B1 | 7/2001 | Bolton et al. |
| 6,296,075 B1 | 10/2001 | Gish et al. |
| 6,312,542 B1 | 11/2001 | Nagata et al. |
| 6,345,688 B1 | 2/2002 | Veen et al. |
| 6,376,396 B1 | 4/2002 | Thorn et al. |
| 6,378,179 B1 | 4/2002 | Hirsch |
| 6,390,563 B1 | 5/2002 | Haverkamp et al. |
| 6,410,464 B1 | 6/2002 | Menzies et al. |
| 6,419,729 B1 | 7/2002 | Duffy et al. |
| 6,426,130 B2 | 7/2002 | Jones et al. |
| 6,429,154 B1 | 8/2002 | Trotter |
| 6,495,229 B1 | 12/2002 | Carte et al. |
| 6,514,889 B1 | 2/2003 | Theoret et al. |
| 6,524,691 B2 | 2/2003 | Sugawara et al. |
| 6,534,145 B1 | 3/2003 | Boyles |
| 6,541,105 B1 | 4/2003 | Park |
| 6,598,636 B1 | 7/2003 | Schurmann et al. |
| 6,755,483 B2 | 6/2004 | Yukawa et al. |
| 6,821,597 B1 | 11/2004 | Price et al. |
| 6,913,718 B2 | 7/2005 | Ducker et al. |
| 7,201,253 B2 | 4/2007 | Duval et al. |
| 7,226,656 B2 | 6/2007 | Coates et al. |
| 7,427,575 B2 | 9/2008 | Shaffer |
| 7,470,339 B2 | 12/2008 | Hoffmann et al. |
| 7,497,509 B2 | 3/2009 | Omiya et al. |
| 7,500,541 B2 | 3/2009 | Schmidt et al. |
| 7,514,026 B1 | 4/2009 | Zafiroglu |
| 7,591,346 B2 | 9/2009 | Thompson et al. |
| 7,709,405 B2 | 5/2010 | Wenstrup et al. |

(56) References Cited

U.S. PATENT DOCUMENTS

| | | |
|---|---|---|
| 7,757,810 B2 | 7/2010 | Sparks et al. |
| 7,757,811 B2 | 7/2010 | Fox et al. |
| 7,837,009 B2 | 11/2010 | Gross et al. |
| 7,867,601 B2 | 1/2011 | Ikishima et al. |
| 7,918,313 B2 | 4/2011 | Gross et al. |
| 8,118,177 B2 | 2/2012 | Drapela et al. |
| 8,153,219 B2 | 4/2012 | Hooft |
| 8,194,879 B2 | 6/2012 | Ishikawa et al. |
| 8,322,487 B1 | 12/2012 | Kitchen et al. |
| 8,365,862 B2 | 2/2013 | Coates et al. |
| 8,496,088 B2 | 7/2013 | Kitchen et al. |
| 8,534,419 B2 | 9/2013 | Coates et al. |
| 8,950,549 B2 | 2/2015 | Coates et al. |
| 9,151,040 B2 | 2/2015 | Coates et al. |
| 9,278,586 B2 | 3/2016 | Kierzkowski |
| 2001/0000162 A1 | 4/2001 | Fletemier et al. |
| 2001/0015249 A1 | 8/2001 | Mohr |
| 2001/0023008 A1 | 9/2001 | Offermann et al. |
| 2002/0011306 A1 | 1/2002 | Hannington et al. |
| 2002/0015842 A1 | 2/2002 | Yanagiuchi |
| 2002/0033215 A1 | 3/2002 | Aoki |
| 2002/0160682 A1 | 10/2002 | Zeng et al. |
| 2003/0066708 A1 | 4/2003 | Allison et al. |
| 2003/0068943 A1 | 4/2003 | Fay |
| 2003/0099810 A1 | 5/2003 | Allison et al. |
| 2003/0176131 A1 | 9/2003 | Tilton |
| 2003/0188817 A1 | 10/2003 | Yukawa et al. |
| 2004/0021247 A1 | 2/2004 | Habisreitinger et al. |
| 2004/0077247 A1 | 4/2004 | Schmidt et al. |
| 2004/0077738 A1 | 4/2004 | Field et al. |
| 2004/0111817 A1 | 6/2004 | Chen et al. |
| 2004/0122396 A1 | 6/2004 | Maldonado et al. |
| 2004/0131836 A1 | 7/2004 | Thompson |
| 2004/0173298 A1 | 9/2004 | Boiocchi et al. |
| 2004/0176003 A1 | 9/2004 | Yang et al. |
| 2004/0180177 A1* | 9/2004 | Ray ............................ B32B 5/02 428/86 |
| 2004/0180592 A1 | 9/2004 | Ray |
| 2004/0192145 A1 | 9/2004 | Theoret et al. |
| 2004/0231915 A1 | 11/2004 | Thompson, Jr. et al. |
| 2004/0238275 A1 | 12/2004 | Keller et al. |
| 2004/0256175 A1 | 12/2004 | Gnadig |
| 2005/0084641 A1 | 4/2005 | Downs et al. |
| 2005/0136235 A1* | 6/2005 | Rockwell ............... B29C 43/228 428/218 |
| 2005/0211358 A1 | 9/2005 | Tanno |
| 2006/0090958 A1 | 5/2006 | Coates et al. |
| 2006/0105664 A1 | 5/2006 | Zafiroglu |
| 2006/0124387 A1 | 6/2006 | Berbner et al. |
| 2006/0137799 A1 | 6/2006 | Haque et al. |
| 2006/0240732 A1 | 10/2006 | Araga et al. |
| 2006/0289230 A1 | 12/2006 | Connelly et al. |
| 2006/0289231 A1 | 12/2006 | Priebe et al. |
| 2007/0190871 A1 | 8/2007 | Patel |
| 2007/0277948 A1 | 12/2007 | Carbo et al. |
| 2008/0001431 A1* | 1/2008 | Thompson ............... B60R 13/08 181/290 |
| 2008/0050565 A1 | 2/2008 | Gross et al. |
| 2008/0057283 A1 | 3/2008 | Blinkhorn et al. |
| 2008/0064794 A1 | 3/2008 | Murdock et al. |
| 2008/0073146 A1 | 3/2008 | Thompson et al. |
| 2008/0166940 A1 | 7/2008 | Nunn et al. |
| 2008/0233348 A1 | 9/2008 | Ishiwatari et al. |
| 2008/0251187 A1 | 10/2008 | Haque et al. |
| 2008/0296087 A1 | 12/2008 | Tanaka et al. |
| 2008/0311363 A1 | 12/2008 | Haskett et al. |
| 2009/0071322 A1 | 3/2009 | Oxford et al. |
| 2009/0148644 A1 | 6/2009 | Francis |
| 2009/0162595 A1 | 6/2009 | Ko et al. |
| 2009/0255619 A1 | 10/2009 | Tong |
| 2010/0000640 A1 | 1/2010 | Kierzkowski et al. |
| 2010/0021667 A1 | 1/2010 | Yanagawa |
| 2010/0038169 A1 | 2/2010 | Lee |
| 2010/0168286 A1 | 7/2010 | Gladfelter et al. |
| 2010/0270101 A1 | 10/2010 | Yukawa |
| 2010/0304109 A1 | 12/2010 | Schilling et al. |
| 2011/0004414 A1 | 1/2011 | McKim |
| 2011/0070794 A1 | 3/2011 | Gladfelter |
| 2011/0082386 A1 | 4/2011 | Sheraton, Sr. |
| 2011/0139543 A1* | 6/2011 | Coates ...................... B32B 5/08 181/290 |
| 2011/0159236 A1 | 6/2011 | Nakae et al. |
| 2011/0226547 A1 | 9/2011 | Kühl et al. |
| 2011/0274921 A1 | 11/2011 | Li et al. |
| 2011/0293911 A1 | 12/2011 | Coates et al. |
| 2012/0024626 A1* | 2/2012 | Coates ................ B32B 37/1284 156/60 |
| 2012/0037447 A1 | 2/2012 | Duval et al. |
| 2012/0058289 A1 | 3/2012 | Coates et al. |
| 2013/0078422 A1* | 3/2013 | Tinianov .................. B32B 5/26 428/138 |
| 2013/0112499 A1* | 5/2013 | Kitchen ................... B32B 5/26 181/296 |
| 2013/0192921 A1 | 8/2013 | Coates et al. |
| 2013/0327590 A1 | 12/2013 | Grube et al. |
| 2015/0364730 A1 | 12/2015 | Glaspie |

FOREIGN PATENT DOCUMENTS

| | | |
|---|---|---|
| CA | 2350477 A1 | 5/2000 |
| CA | 2421458 A1 | 4/2004 |
| DE | 6930307 U | 12/1969 |
| DE | 19508335 A1 | 11/1995 |
| DE | 4424328 A1 | 1/1996 |
| DE | 10345575 B3 | 1/2005 |
| DE | 102004016934 A1 | 10/2005 |
| DE | 19714348 A1 | 2/2008 |
| DE | 102011079413 A1 | 1/2013 |
| EP | 0607946 B1 | 7/1994 |
| EP | 0909680 A1 | 4/1999 |
| EP | 0911185 A2 | 4/1999 |
| EP | 0949066 A2 | 10/1999 |
| EP | 1577123 B1 | 9/2005 |
| EP | 1640207 A1 | 3/2006 |
| EP | 1775714 A1 | 4/2007 |
| EP | 2312073 A1 | 4/2011 |
| GB | 823203 A | 11/1959 |
| GB | 2079626 A | 1/1982 |
| GB | 2322862 A | 9/1998 |
| GB | 2421251 A | 6/2006 |
| JP | S56-38080 A | 9/1982 |
| JP | S60-137528 U | 9/1985 |
| JP | 63-11541 U | 1/1988 |
| JP | 02-302484 A | 12/1990 |
| JP | H05-113020 A | 7/1993 |
| JP | 7-266802 A | 10/1995 |
| JP | H08-223855 A | 8/1996 |
| JP | H10-121597 A | 5/1998 |
| JP | H10-156994 A | 6/1998 |
| JP | H10148909 A | 6/1998 |
| JP | H10237978 A | 9/1998 |
| JP | H10-273 900 A | 10/1998 |
| JP | H10-280259 A | 10/1998 |
| JP | H11508328 A | 7/1999 |
| JP | 2000-310023 A | 7/2000 |
| JP | 2001-228879 A | 8/2001 |
| JP | 2001-348540 A | 12/2001 |
| JP | 2002-052634 A | 2/2002 |
| JP | 2002-067608 A | 3/2002 |
| JP | 2004-107605 | 8/2004 |
| JP | 2004-291549 A | 10/2004 |
| JP | 2005-036364 A | 2/2005 |
| JP | 2005-076144 A | 3/2005 |
| JP | 2006-104298 A | 4/2006 |
| JP | 2006-143867 A | 6/2006 |
| JP | 2006-160197 A1 | 6/2006 |
| JP | 2006-193838 A | 7/2006 |
| JP | 2006-273909 A | 10/2006 |
| JP | 2007-025044 A | 1/2007 |
| JP | 2007-512990 A | 5/2007 |
| JP | 2007-223273 A | 6/2007 |
| JP | 2008-068799 A | 3/2008 |
| JP | 2008-132972 A | 6/2008 |

(56) References Cited

FOREIGN PATENT DOCUMENTS

| WO | 88/09406 A1 | 12/1988 |
|---|---|---|
| WO | 93/23596 A1 | 11/1993 |
| WO | 94/03343 A1 | 2/1994 |
| WO | 95/25634 A1 | 9/1995 |
| WO | 97/00989 A1 | 1/1997 |
| WO | 97/04445 A1 | 2/1997 |
| WO | 98/18656 A1 | 5/1998 |
| WO | 98/38370 A1 | 9/1998 |
| WO | 98/53444 A1 | 11/1998 |
| WO | 99/61963 A1 | 12/1999 |
| WO | 00/27671 A1 | 5/2000 |
| WO | 2000/032142 A1 | 6/2000 |
| WO | 00/53456 A1 | 9/2000 |
| WO | 2001/019306 A1 | 3/2001 |
| WO | 02/09089 A1 | 1/2002 |
| WO | 02/085648 A1 | 10/2002 |
| WO | 02/098643 A2 | 12/2002 |
| WO | 03/000976 A1 | 1/2003 |
| WO | 03/069596 A1 | 8/2003 |
| WO | 03/074267 A1 | 9/2003 |
| WO | 03/097227 A1 | 11/2003 |
| WO | 2005/081226 A1 | 9/2005 |
| WO | 2006/107847 A2 | 10/2006 |
| WO | 2007/051232 A1 | 5/2007 |
| WO | 2007/125830 A1 | 8/2007 |
| WO | 2008/050994 A1 | 5/2008 |
| WO | 2009/039900 A1 | 4/2009 |
| WO | 2010/042995 A1 | 4/2010 |
| WO | 2010/063079 A1 | 6/2010 |
| WO | 2010/094897 A2 | 8/2010 |
| WO | 2012/038737 A1 | 3/2012 |
| WO | 2017/028962 A1 | 2/2017 |

OTHER PUBLICATIONS

Acoustic Textiles-Lighter, Thinner and More Sound-Absorbent, Technical Textiles International, International Newsletters, dated Sep. 2002, pp. 15-18.
Bies Reference 1 of 7; Engineering Noise Control Theory and Practice; $3^{rd}$ Edition (2003).
Bies Reference 2 of 7; Engineering Noise Control Theory and Practice; $3^{rd}$ Edition (2003).
Bies Reference 3 of 7; Engineering Noise Control Theory and Practice; $3^{rd}$ Edition (2003).
Bies Reference 4 of 7; Engineering Noise Control Theory and Practice; $3^{rd}$ Edition (2003).
Bies Reference 5 of 7; Engineering Noise Control Theory and Practice; $3^{rd}$ Edition (2003).
Bies Reference 6 of 7; Engineering Noise Control Theory and Practice; $3^{rd}$ Edition (2003).
Bies Reference 7 of 7; Engineering Noise Control Theory and Practice; $3^{rd}$ Edition (2003).
DEXI-TEX 3D, URL = http://web.archive.org/web/20070830042658 http://www.inccorp.com.au/page/deci_tex_3d.html#top, including nine (9) documents from links therein, download date Aug. 26, 2011, 19 pages.
Natural Fiber Based Lightweight Sound Absorber Materials, SAE Technical Paper Series, Jeffrey S. Hurley, Buckeye Technologies Inc., dated May 2007.
Notes on Sound Absorption Technology, Uno Ingard (1994).
European Communication Pursuant to Article 94(3) EPC for European Application No. 16732797.2, dated Sep. 12, 2018.

\* cited by examiner

MULTI-IMPEDANCE COMPOSITE

FIELD

The present teachings relate generally to a sound absorbing material, and more particularly, to a sound absorbing multi-layer composite.

BACKGROUND

Industry is constantly seeking new and/or improved materials and methods of providing sound and noise reduction in a variety of applications. Materials that exhibit sound absorption characteristics are often employed as a way to provide noise reduction in a wide range of industrial, commercial, and domestic applications. It is often desirable to reduce noises of machinery, engines, and the like. For example, in automotive applications, it may be undesirable for a passenger to hear noises coming from the engine compartment or from other places of the vehicle.

Desired sound absorption has typically been achieved by using sound absorbing materials having a large mass and weight. These sound absorption materials may be a single layer of material. Given the large size, the sound absorbing materials are bulky and thick, so they are often be expensive to produce and/or to ship or transport after production. There is also often limited, if any, ability for customization of the materials based on the needs of the end user, customer, or installer (e.g., an automobile manufacturer), especially for single layer systems. Examples of sound absorbing materials include those disclosed in U.S. Pat. Nos. 8,496,088; 8,469,145; and 7,226,656, all of which are incorporated by reference.

Industry is constantly seeking materials, and the methods for producing materials, having improved noise reduction characteristics in a variety of applications, such as through improved sound absorption materials for vehicles. It is further desirable to have sound absorption materials that have greater flexibility in customization based on the end use of the material. There is also a need for lighter weight materials that are easier to produce, package, and/or ship.

SUMMARY

The present teachings meet one or more of the above needs by the improved devices and methods described herein. The present teachings provide improved sound absorption by creating a multi-impedance system that may allow for lower overall composite thickness but allow for better fitment into constrained areas. The present teachings envision the use of a plurality of layers of material to form the acoustic composite that creates a multi-impedance mismatched profile throughout the thickness of the composite through the use of layers of material having different levels of specific air flow resistance.

The acoustic composite may comprise a plurality of discrete air flow resistive layers layered on top of each other. The layers may include a top layer and one or more lofted fibrous layers produced by a lapping process. The top layer may have a specific air flow resistance that is greater than a specific air flow resistance of the one or more lofted fibrous layers. The acoustic composite may further comprise a middle layer. At least one of the one or more lofted fibrous layers may be sandwiched between the top layer and the middle layer. The middle layer may be sandwiched between two lofted fibrous layers. The middle layer may have a specific air flow resistance that is greater than the specific air flow resistance of the one or more lofted fibrous layers. The specific air flow resistance of the top layer, middle layer or both, may be about 100 mks Rayls to about 10,000 mks Rayls. The top layer, the middle layer, or both, may be a fibrous scrim, a film, or a foil. Each layer of the acoustic composite may have a specific air flow resistance that is different from a layer directly adjacent. The acoustic composite as a whole may exhibit greater sound absorption than the summation of performance of the layers individually.

The teachings herein also include an acoustic composite comprising a plurality of layers, where the layers include: a top layer having a specific air flow resistance of about 100 mks Rayls to about 10,000 mks Rayls; a middle layer having a specific air flow resistance of about 100 mks Rayls to about 10,000 mks Rayls; a first lofted nonwoven layer sandwiched between the top layer and the middle layer, the first lofted nonwoven layer having a lower specific air flow resistance than the top layer and the middle layer; and a second lofted nonwoven layer attached to the middle layer opposite the first lofted nonwoven layer, the first lofted nonwoven layer having a lower specific air flow resistance than the top layer and the middle layer. The acoustic composite as a whole may exhibit greater sound absorption than the summation of performance of the layers individually. The top layer, the middle layer, or both may be a nonwoven or woven fibrous scrim layer, a perforated film, or a foil. The first lofted nonwoven layer, the second lofted nonwoven layer, or both, may be formed from a lapping process. The first lofted nonwoven layer and the second nonwoven layer may have the same or different specific air flow resistances. The top layer and the middle layer may have the same or different air flow resistances. The acoustic composite may include an additional layer, and the second lofted nonwoven layer may be sandwiched between the middle layer and the additional layer. The additional layer may have a greater specific air flow resistance than the second lofted nonwoven layer.

The acoustic composite in any embodiment may comprise a pressure sensitive adhesive on a side of the acoustic composite opposite the top layer for adhering the acoustic composite to a substrate. The acoustic composite may have a total thickness of about 2 mm to about 155 mm. The layers may be bonded together with binder fibers, one or more adhesives that do not block air flow through the acoustic composite, or both. The layers may be attached to each other by one or more lamination processes.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Acoustic materials, such as acoustic composite materials like the materials as discussed herein, may have a wide range of applications, such as where sound absorption and/or insulation are desired. For example, and not to serve as limiting, acoustic materials may be used in automotive applications, generator set engine compartments, commercial vehicle engines, in-cab areas, architectural applications, and even heating, ventilating and air conditioning (HVAC) applications. Acoustic materials may be suitable for (but not limited to) use as sound attenuation materials in vehicles, attenuating sound originating from outside a cabin of a motor vehicle and propagating toward the inside of the cabin. Acoustic materials may be used for machinery and equipment insulation, motor vehicle insulation, domestic appliance insulation, dishwashers, and commercial wall and ceiling panels. Acoustic materials may be used in the engine cavity of a vehicle, on the inner and outer dash panels and under the carpeting in the cabin, for example. Acoustic materials may be used inside cabs to provide acoustic absorption. Acoustic materials may be used in any application where a lighter weight acoustic material is desired. Acoustic materials may be used as interior decorative trim, in which case it may be necessary to face the acoustic sheet with some form of decorative fabric or other covering. The acoustic sheets may be used in combination with other sound absorption materials. Acoustic materials may also be useful as an acoustic pin board material or as a ceiling tile.

Composite products, such as composite acoustic materials, may be formed, at least in part, from porous limp sheets with relatively high air flow resistances, porous bulk absorbers or spacer materials having air flow resistances substantially smaller than the limp sheets, or both. Methods for producing such composite products include those set out in co-owned International Application No. PCT/AU2005/000239 entitled "Thermoformable Acoustic Product" (published as WO/2005/081226), the contents of which are hereby incorporated herein by reference.

In general, materials used for sound absorption (e.g., composite acoustic materials, nonwoven materials, woven materials, the like, or combination thereof) must exhibit air permeability properties. Critical characteristics include air flow resistance (resistance to air flow through the material), tortuosity (the path length of a sound wave within the material), and porosity (void to volume ratio). With fibrous materials, airflow resistance is an overwhelmingly critical factor controlling sound absorption.

Air flow resistance is measured for a particular material at a particular thickness. The air flow resistance is normalized by dividing the air flow resistance (in Rayls) by the thickness (in meters) to derive the air flow resistivity measured in Rayls/m. ASTM standard C522-87 and ISO standard 9053 refer to the methods for determination of air flow resistance for sound absorption materials. Within the context of the described embodiments, air flow resistance, measured in mks Rayls, will be used to specify the air flow resistance; however other methods and units of measurement are equally valid. Within the context of the described embodiments, air flow resistance and air flow resistivity can be assumed to also represent the specific air flow resistance, and specific air flow resistivity, respectively.

The sound absorption coefficient (SAC) and sound transmission loss (STL) level of an air permeable or porous material, such as a bulk composite, may be improved and tuned by layering materials together. These layers may have different levels of specific air flow resistance. The building of these types of layers creates a multi-acoustic impedance mismatched profile throughout the thickness of the composite. The composite may begin to perform like a decoupled mass barrier system, which is traditionally used to block lower frequency sound. Therefore, the multi-impedance fibrous composite may begin to act like a sound transmission barrier at a lower mass. This mismatched profile amplifies the noise reduction capability (both SAC and STL) of the composite. Surprisingly, the results are a noise reduction and/or sound absorption at a greater level than that of the summation of the performance of the individual layers as standalone units. Therefore, the layers of materials produce a generally synergistic effect to improve sound absorption performance.

By utilizing the synergistic performance of a multi-impedance mismatched layered composite, mass of material in each layer may be reduced in comparison to traditional single or dual layered acoustic material (e.g., a non-faced or single low air flow resistance (AFR) faced open cell foam or a single-scrim low AFR faced fiber). Reducing the mass of fiber in the matrix forming one or more layers of the acoustic composite may reduce material cost and/or manufacturing costs, as lighter weight layers (e.g., lofted fiber layers) may be produced more quickly than a heavier weight layer.

The performance of the multi-impedance systems may be about the same as or may even exceed that of traditional materials. However, multi-impedance systems may allow for lower overall composite thickness than traditional materials. The lower thickness of the multi-impedance acoustic composite may allow for better fitment into packaging space constrained areas. Shipping improvements may be realized since more material can be shipped in a finite volume at equal or greater acoustic performance as compared to a heavier and/or thicker sound absorption product. The acoustic composite may function to absorb sound to reduce noise. The acoustic composite may include one or more layers, and preferably a plurality of layers. The layers may be of different materials. Some layers may be of the same materials. The type of materials forming the layers, order of the layers, number of layers, thickness of layers, or a combination thereof, may be chosen based on the air flow resistive properties of each material, the desired air flow resistive properties of the acoustic composite as a whole, the desired weight, density and/or thickness of the acoustic composite (e.g., based upon the space available in the vehicle where the acoustic composite will be installed), or a combination thereof. For example, some layers may have a lower air flow resistance while other layers may have a higher air flow resistance. As mentioned above, the layering of layers having different air flow resistive properties produces a multi-impedance acoustic mismatched profile through the entire acoustic composite, which provides improved noise reduction capability of the composite layer. Therefore, the layers may be arranged so that a layer of higher specific air flow resistance is joined to or is adjacent to one or more layers of a different specific air flow resistance (e.g., a lower air flow resistance).

Any of the materials described herein may serve as one or more layers of the acoustic composite. Any of the materials described herein may be combined with other materials described herein (e.g., in the same layer or in different layers of the acoustic composite). The acoustic composite may include a plurality of layers, some or all of which serve different functions or provide different properties to the acoustic composite (when compared to other layers of the acoustic composite). The ability to combine layers of materials having different properties may allow the acoustic composite to be customized based on the application. For example, one or more acoustic composite layers may provide insulation. One or more acoustic composite layers may include one or more adhesive materials (e.g., as part of the fibers of the layer or as a separate element in or on the layer) for binding the fibers together, for binding layers together, or both. One or more acoustic composite layers may support a facing material or top layer. One or more acoustic composite layers may provide heat resistance (e.g., if the acoustic composite is located in an area that is exposed to high temperatures). One or more acoustic composite layers may provide stiffness or structural properties to the acoustic composite. One or more acoustic composite layers may provide flexibility and/or softness to the acoustic composite. One or more acoustic composite layers may attach directly to a wall or surface of a substrate to provide acoustic absorption. One or more acoustic composite layers may be any material known to exhibit sound absorption characteristics. One or more acoustic composite layers may be at least partially formed from fibrous material. One or more acoustic composite layers may be at least partially formed as a web of material (e.g., a fibrous web). One or more acoustic composite layers may be formed from nonwoven material, such as short fiber nonwoven materials. One or more acoustic composite layers may be a porous bulk absorber (e.g., a lofted porous bulk absorber formed by a carding and/or lapping process). One or more acoustic composite layers may be formed by air laying. The acoustic composite (or one or more of the acoustic composite layers) may be an engineered 3D structure. It is clear from these potential layers that there is great flexibility in creating an acoustic material that meets the specific needs of an end user, customer, installer, and the like.

Acoustic materials for sound absorption may have a relatively high air flow resistance to present acoustic impedance to the sound pressure wave incident upon the material. Air permeability should be managed to ensure predictable and consistent performance. This may be achieved through management of fiber sizes, types, and lengths, among other factors. A homogeneous, short fiber nonwoven textile may be desirable. In some applications, desirable levels of air permeability may be achieved by combining plural nonwoven materials of differing densities together to form a composite product. A combination of materials having low permeability with those having high permeability can be used to achieve locally reactive acoustic behavior. One or more of the acoustic materials (e.g., nonwoven materials) may be short fiber technology-based (SFT-based) materials. The SFT-based materials may be formed using gravity deposition or a process similar to air laying. The SFT-based materials may be densified. A SFT-based textile can be advantageous in terms of reducing cost and providing a significant environmental benefit by reducing or eliminating the amount of waste disposed to landfill. One or more acoustic composite layers may be formed by needle-punching, alone or in combination with any of the methods of forming the layer described herein or known in the art.

An acoustic composite layer (e.g., nonwoven material) may be formed to have a thickness and density selected according to the required physical and air permeability properties desired of the finished acoustic composite layer (and/or the acoustic composite as a whole). The acoustic composite layer may be any thickness depending on the application, location of installation, shape, fibers used (and the lofting of the acoustic composite layer), or other factors.

The density of the acoustic composite layer may depend, in part, on the specific gravity of any additives incorporated into the material comprising the layer (such as nonwoven material), and/or the proportion of the final material that the additives constitute. Bulk density generally is a function of the specific gravity of the fibers and the porosity of the material produced from the fibers, which can be considered to represent the packing density of the fibers.

A low density acoustic composite material, which may be one or more of the acoustic composite layers, may be designed to have a low density, with a finished thickness of about 1.5 mm or more, about 4 mm or more, about 5 mm or more, about 6 mm or more, or about 8 mm or more. The finished thickness may be about 350 mm or less, about 250 mm or less, about 150 mm or less, about 75 mm or less, or about 50 mm or less. The acoustic composite material, which may be one or more of the acoustic composite layers, may be formed as a relatively thick, low density nonwoven, with a bulk density of 10 kg/m$^3$ or more, about 15 kg/m$^3$ or more, or about 20 kg/m$^3$ or more. The thick, low density nonwoven may have a bulk density of about 200 kg/m$^3$ or less, about 100 kg/m$^3$ or less, or about 60 kg/m$^3$ or less. The acoustic composite material (e.g., serving as one or more acoustic composite layers) thus formed may have an air flow resistivity of about 400 Rayls/m or more, about 800 Rayls/m or more, or about 100 Rayls/m or more. The acoustic composite material may have an air flow resistivity of about 200,000 Rayls/m or less, about 150,000 Rayls/m or less, or about 100,000 Rayls/m or less. Low density acoustic composite materials may even have an air flow resistivity of up to about 275,000 Rayls/m. Additional sound absorption may also be provided by a facing layer or layer of other material on the acoustic composite layer (e.g., by laminating or otherwise attaching or adhering to a surface of the acoustic composite layer). A facing layer or other layer within the acoustic composite may include air flow resistive fabrics or films that may provide an air flow resistivity of about 100,000 Rayls/m or higher, about 275,000 Rayls/m or higher, 1,000,000 Rayls/m or higher, or even 2,000,000 Rayls/m or higher. For example, a facing layer may have a thickness that is about 0.0005 m thick and may have a specific air flow resistance of about 1000 Rayls. Therefore, the air flow resistivity would be about 2,000,000 Rayls/m. In another example, a fabric or film facing layer may have a thickness of about 0.0005 inches, or about 0.013 mm, with a specific air flow resistance of about 1000 Rayls. Therefore air flow resistivity would be about 7,700,000 Rayls/m.

Where one or more of the layers of the acoustic composite is an acoustic composite material of a low density material (such as a nonwoven material), the nonwoven material may be used as a porous bulk absorber. In order to form a porous bulk absorber of the desired dimensions, once the nonwoven material is formed, the nonwoven material may be vertically lapped, rotary lapped, or air laid. The lapped or air laid material may then be thermally bonded. High density nonwoven materials may also be used for a variety of applications, such as, for example, a porous limp sheet. The low and high density nonwoven materials may be used together to form a plurality of layers of the acoustic composite or the entire acoustic composite.

The material fibers that make up an acoustic composite material/layer may have a linear mass density from about 0.5 to about 25 denier, preferably about 1 to about 6 denier, more preferably about 1 to about 4 denier. The fibers may have a staple length of about 1.5 millimeters or greater, or even up to about 70 millimeters or greater (e.g., for carded fibrous webs). For example, the length of the fibers may be between about 30 millimeters and about 65 millimeters, with an average or common length of about 50 or 51 millimeters staple length, or any length typical of those used in fiber carding processes. Short fibers may be used in some other nonwoven processes, such as the formation of air laid fibrous webs. Short fibers may have a length of about 12 mm or less, about 6 mm or less, or even about 2 mm or less. For example, some or all of the fibers may be a powder-like consistency (e.g., with a fiber length of about 2 millimeters to about 3 millimeters or even about 2 millimeters or less). Fibers of differing lengths may be combined to form the acoustic composite layer (e.g., staple fibers may be mixed with short fibers). The fiber length may vary depending on the application, the acoustic properties desired, dimensions and/or properties of the acoustic material (e.g., density, porosity, desired air flow resistance, thickness, size, shape, and the like of the acoustic layer), or any combination thereof. More effective packing of the shorter fibers may allow pore size to be more readily controlled in order to achieve desirable acoustic characteristics.

In some applications, the use of shorter fibers may have advantages in relation to the performance of the acoustic material. The selected air flow resistivity achieved using short fibers may be significantly higher than the air flow resistivity of a conventional nonwoven material comprising substantially only conventional staple fibers having a long length of, for example, from at least about 30 mm and less than about 100 mm. Without being limited by theory, it is believed that this unexpected increase in air flow resistance may be attained as a result of the short fibers being able to pack more efficiently (e.g., more densely) in the nonwoven material than long fibers. The shorter length may reduce the degree of disorder in the packing of the fibers as they are dispersed onto a surface, such as a conveyor, or into a preformed web during production. The more ordered packing of the fibers in the material may in turn lead to an increase in the air flow resistivity. In particular, the improvement in fiber packing may achieve a reduced interstitial space in between fibers of the nonwoven material to create a labyrinthine structure that forms a tortuous path for air flow through the material, thus providing a selected air flow resistance, and/or selected air flow resistivity. Accordingly, it may be possible to produce comparatively lightweight nonwoven materials without unacceptably sacrificing performance.

The fibers forming one or more acoustic composite layers may be natural or synthetic fibers. Suitable natural fibers may include cotton, jute, wool, cellulose and ceramic fibers. Suitable synthetic fibers may include polyester, polypropylene, polyethylene, Nylon, aramid, imide, acrylate fibers, or combination thereof. Other fibers may include glass. Fibers may have a particular stiffness to provide structural properties to the acoustic composite. The acoustic composite layer material may comprise polyester fibers, such as polyethylene terephthalate (PET), and co-polyester/polyester (Co-PET/PET) adhesive bi-component fibers. The fibers may be 100% virgin fibers, or may contain fibers regenerated from postconsumer waste (for example, up to about 90% fibers regenerated from postconsumer waste).

One or more layers of the acoustic composite may include a plurality of bi-component fibers. The bi-component fibers may include a core material and a sheath material around the core material. The sheath material may have a lower melting point than the core material. The web of fibrous material may be formed, at least in part, by heating the material to a temperature to soften the sheath material of at least some of the bi-component fibers. The temperature to which the fibrous web is heated to soften the sheath material of the bi-component may depend upon the physical properties of the sheath material. For a polyethylene sheath, the temperature may be about 140 degrees C. to about 160 degrees C. For a polypropylene sheath, the temperature may be higher (for example, about 180 degrees C.). The bi-component fibers may be formed of short lengths chopped from extruded bi-component fibers. The bi-component fibers may have a sheath-to-core ratio (in cross-sectional area) of about 25% to about 35%.

The fibers may be used to form a thermoformable short fiber nonwoven, which indicates a nonwoven material that may be formed with a broad range of densities and thicknesses and that contains a thermoplastic and/or thermoset binder. The thermoformable short fiber nonwoven material may be heated and thermoformed into a specifically shaped thermoformed product.

The fibers of one or more layers of the acoustic composite may be blended or otherwise combined with suitable additives such as other forms of recycled waste, virgin (non-recycled) materials, binders, fillers (e.g., mineral fillers), adhesives, powders, thermoset resins, coloring agents, flame retardants, longer staple fibers, etc., without limitation.

The fibers forming one or more layers of acoustic composite may be formed into a nonwoven web using nonwoven processes including, for example, blending fibers (e.g., blending bi-component fibers, conventional staple fibers, or combination thereof), carding, lapping, air laying, mechanical formation, or combination thereof. The fibers of one or more acoustic composite layers may be opened and blended using conventional processes. The fibers may be blended within the structure of the fibrous web. A carded web may be cross-lapped or vertically lapped, to form a voluminous nonwoven web. The carded web may be vertically lapped according to processes such as "Struto" or "V-Lap", for example. This construction provides a web with relative high structural integrity in the direction of the thickness of the composite sound absorber, thereby minimizing the probability of the web falling apart during application, or in use. Carding and lapping processes create a nonwoven fiber layer that has good compression resistance through the vertical cross-section and enables the production of a lower mass acoustic treatment, especially with lofting to a higher thickness without adding significant amounts of fiber to the matrix. It is contemplated that a small amount of hollow conjugate fiber (i.e., in a small percentage such as about 10% of the fiber or less, about 5% of the fiber or less, about 1% of the fiber or less) may improve lofting capability and resiliency to improve sound absorption. Such an arrangement also provides the ability to achieve a low density web with a relatively low bulk density. An air laid or mechanically formed web may also be produced, though formation of a bulk layer by a lapping process may enable higher thickness at lower weights (or lower densities) as compared to air laying. The web may then be thermally bonded, air bonded, mechanically consolidated, the like, or combination thereof, to form a cohesive nonwoven insulation material.

One or more of the layers of the acoustic composite may be a scrim layer. The scrim layer may be formed from woven or nonwoven fibers. The scrim layer may have a specific air flow resistance of about 50 mks Rayls or more, about 75 mks Rayls or more, or about 95 mks Rayls or more. The scrim layer may have a specific air flow resistance of about 20,000 mks Rayls or less, about 17,500 mks Rayls or less, or about 15,000 mks Rayls or less. For example, the scrim layer may have a specific air flow resistance of about 100 to about 10,000 mks Rayls.

One or more layers of the acoustic composite may be a film or a facing laminate, such as a reinforced foil. The film or facing laminate may be a generally solid layer made permeable by forming a plurality of openings. The film or facing laminate may be made permeable by methods of creating openings in the layer, such as by perforation. The perforation, for example, of a generally solid layer may then enable permeability for good acoustic absorption properties. The film or facing laminate may have a specific air flow resistance of about 50 mks Rayls or more, about 75 mks Rayls or more, or about 95 mks Rayls or more. The film or facing laminate may have a specific air flow resistance of about 20,000 mks Rayls or less, about 17,500 mks Rayls or less, or about 15,000 mks Rayls or less. For example, the scrim layer may have a specific air flow resistance of about 100 to about 10,000 mks Rayls. The facing laminate or film may be applied to another acoustic composite layer. The film may be a reflective film. The film may be any polymeric film, for example a polyester (e.g., PET) film. The facing laminate may be a foil (e.g., a reinforced foil, a metallic foil, or both). The foil may be laminated to another acoustic composite layer. For example, the foil may be a laminated reinforced aluminum foil. If the film or foil is an outermost layer of the acoustic composite, the film or foil may be perforated prior to or after being applied to the acoustic composite layer.

The openings in the facing laminate or foil, e.g., formed by perforation, or the openings of a scrim layer, may be spread across the entire layer. The openings or perforations may be generally concentrated in particular areas of the layer (e.g., areas where permeability and/or air flow resistance are desired). The perforations may be created in any design or pattern that provides permeability to the layer. For example, the perforations may be aligned in rows and/or columns over the layer (e.g., creating a generally uniform pattern along the layer). The perforations may be arranged in a staggered pattern. The perforations may create open space accounting for approximately 0.1 percent or more of the layer, about 1 percent or more of the layer, or about 4 percent or more of the layer. The perforations may create open space accounting for about 90 percent of the layer or less, about 40 percent of the layer or less, or about 25 percent of the layer or less. The layer may be applied over other layers of the acoustic composite to provide localized heat reflection without considerably sacrificing the properties of the underneath acoustic composite material and without reducing the acoustic absorption capacity of the existing base material (the one or more acoustic composite layers). For an outermost layer of the acoustic composite, to provide heat reflective properties and protect the acoustic composite layers underneath, the outermost layer may be metalized or aluminized. The outermost layer itself may be metallic (e.g., so that an additional metallization or aluminization step may not be necessary).

Considering the types of layers that may be used as described herein, the multi-layered system preferably varies the specific air flow resistances between the layers of the acoustic composite to enhance sound absorption. The multi-layered system may have a top layer, and one or more layers below the top layer. Preferably, the top layer of the acoustic composite is a layer having a high air flow resistance. For example, the top layer may have a specific air flow resistance of about 100 mks Rayls to about 10,000 minks Rayls. The top layer may be a nonwoven fibrous scrim layer, a woven fibrous scrim layer, a perforated film, facing laminate, or foil.

Below the first layer may be a material having a specific air flow resistance that is less than the specific air flow resistance of the layer above it (i.e., the top layer). This layer is preferably a first lofted layer (e.g., formed by a lapping process), which may be a nonwoven material including any of the fibers or combinations of fibers as discussed herein. This layer may be thicker than the layer above it (i.e., the top layer).

The first lofted layer may be sandwiched between the top layer and a middle layer. The middle layer is preferably a layer having a high air flow resistance. For example, the middle layer may have a specific air flow resistance of about 100 mks Rayls to about 10.000 mks Rayls. The middle layer may have the same specific air flow resistance as the top layer. The middle layer may have a different air flow resistance than the top layer (i.e., less than or greater than the top layer). The middle layer preferably has a specific air flow resistance that is greater than the first lofted layer. The middle layer may be a nonwoven fibrous scrim layer, a women fibrous scrim layer, or a perforated film, facing laminate, or foil. The middle layer may be the same material and/or thickness as the top layer, or the top layer and middle layer may be of different materials or thicknesses.

Below the middle layer may be another layer. This layer may be a material having a specific air flow resistance that is less than the specific air flow resistance of any or all of the layers above it. Preferably, this layer has a specific air flow resistance that is lower than that of the top layer and/or any or all additional high AFR layers (such as the middle layer). This layer is preferably a second lofted layer (e.g., formed by a lapping process), which may be a nonwoven material. The second lofted layer may be the same material and/or thickness as the first lofted layer. The first and second lofted layers may be of different materials, densities or thicknesses. The first and second lofted layers may have the same specific air flow resistance. The first and second lofted layers may have different specific air flow resistances.

In a four layer embodiment, for example, the top and middle layers may be of a higher air flow resistance than the first and second lofted layers. Therefore, the acoustic composite has alternating air flow resistances of the layers (e.g., higher AFR, lower AFR, higher AFR, lower AFR) to produce the multi-impedance mismatched layered composite.

Additional layers may be added to form the acoustic composite, such as any of the materials described herein. For example, an additional high AFR layer may be added. An additional lofted layer may be added instead of or in addition to the high AFR layer. The composite may have a stiffer bottom layer (e.g., the second lofted layer, or another layer). The stiffer bottom layer may provide compression resistance. The composite may have a softer top lofted layer (e.g., the first lofted layer) and may be designed to tune the acoustic absorption performance of the composite in conjunction with the high AFR layers (e.g., the top layer and middle layer).

Two or more of the layers forming the acoustic composite may be coextensive (e.g., having the same shape and/or boundaries). All of the layers may be coextensive. One or more of the layers may have a different shape and or boundary from another layer. For example, one or more layers may extend beyond the boundaries of another layer.

The total thickness of the acoustic composite may depend upon the number and thickness of the individual layers. The thickness may be generally uniform. The thickness may vary across the composite (e.g., if one or more layers are not coextensive and/or if the composite has been molded into a three-dimensional shape). It is contemplated that the total thickness may be about 0.5 mm or more, about 1 mm or more, or about 1.5 mm or more. The total thickness may be about 300 mm or less, about 250 mm or less, or about 175 mm or less. For example, the thickness may be in the range of about 2 mm to about 155 mm. It is also contemplated that some of the individual layers may be thicker than other layers. For example, a lofted nonwoven absorption layer may be thicker than a layer having a high air flow resistance, such as a scrim layer or perforated film layer. The thickness may vary between the same types of layers as well. For example, two scrim layers in the acoustic composite may have different thicknesses. Two lofted nonwoven absorption layers may have different thicknesses. The composite may be tuned to provide more general broad band absorption by adjusting the specific air flow resistance and/or the thickness of any or all of the layers.

The acoustic composite layers may be bonded together to create the finished acoustic composite. One or more layers may be bonded together by elements present in the layers. For example, the binder fibers in the layers may serve to bond the layers together. The outer layers (i.e., the sheath) of bi-component fibers in one or more layers may soften and/or melt upon the application of heat, which may cause the fibers of the individual layers to adhere to each other and/or to adhere to the fibers of other layers. One or more adhesives may be used to join two or more layers. The adhesives may be a powder or may be applied in strips, sheets, or as a liquid, for example. Preferably, the adhesive does not block the airflow through the material (e.g., does not plug openings, perforations, pores, or the like).

The acoustic composite layers may be assembled using a lamination process. Woven or nonwoven fibrous scrims, perforated films, or perforated facing laminates (e.g., a reinforced foil) of a particular acoustic impedance or specific air flow resistance (e.g., the top layer) may be laminated to a layer of a different acoustic impedance or specific air flow resistance (e.g., a thicker lapped and/or lofted nonwoven fiber layer). For example, the acoustic composite may be constructed by carding and lapping one or more thicker nonwoven layers and laminating these together with a higher AFR scrim layer within the nonwoven production and laminating process, or as separate processes. These layers can be laminated to another material, such as one of a different impedance or air flow resistance, such as a high AFR material (e.g., scrim or perforated film layer), which can be laminated to another layer of a different impedance level (e.g., another lapped and/or lofted nonwoven material). Additional layers can be laminated in the same way.

Acoustic properties of the acoustic composite (and/or its layers) may be impacted by the shape of the acoustic composite. The acoustic composite, or one or more of its layers, may be generally flat. The finished acoustic composite may be fabricated into cut-to-print flat parts (e.g., generally planar parts or two-dimensional parts) for installation into the end user, installer, or customer's assembly. The acoustic material may be formed into any shape. For example, the acoustic material may be molded to generally match the shape of the area to which it will be installed. The finished acoustic composite may be molded-to-print into a three-dimensional shape for installation into the end user, installer, or customer's assembly. The three-dimensional geometry of a molded product may provide additional acoustic absorption. The three-dimensional shape may provide structural rigidity and an air space. Such a shape may also form partially enclosed cells, such as a honeycomb or egg-carton type structure, that may provide local reactivity and increase the acoustical performance of the thermoformed acoustic material.

An adhesive may be located on the bottom layer (i.e., the layer of the acoustic composite opposite the top layer). The adhesive may allow for adhering the acoustic composite to a desired substrate. The acoustic material may be provided with a pressure sensitive adhesive (PSA). The PSA may be applied from a roll and laminated to the back side of the acoustic composite layer material (e.g., on the side of the acoustic composite layer opposite the facing layer or top layer), which may be performed concurrently with the lamination of the facing layer or top layer. A release liner may carry the PSA. Prior to installation of the acoustic material, the release liner may be removed from the pressure sensitive adhesive to allow the composite sound absorber to be adhered to a panel, substrate, or surface. For some acoustic materials intended to be used as input components, for example on a vehicle production line, it is desirable that the acoustic material can be installed quickly and easily. To achieve this, for some applications, it may be beneficial to provide a release liner with a high tear strength that is easy to remove.

The PSA may be provided as part of a tape material comprising: a thin flexible substrate; a PSA substance carried on a single side of the substrate, the PSA substance being provided along a length of the substrate (e.g., in an intermittent pattern or as a complete layer); and optionally a mesh carried on the single side. The PSA may be coated onto a silicone coated plastic or paper release liner. The PSA may be of the supported design, where the PSA layer may be bonded to a carrier film, and the carrier film may be bonded to the acoustic composite layer. A thin flexible substrate may be located on the side of the PSA layer opposite the carrier film. The end user may then remove the thin flexible substrate (e.g., release liner) to install the part to the target surface. The supported construction may be up to 100% coverage, or the PSA may be supplied in an intermittent pattern. The supported construction may include embedded mesh.

The purpose of the substrate of the tape material is to act as a carrier for the PSA substance so that the PSA substance can be applied (adhered) to the sound absorbing material. The substrate further acts as the release liner and can be subsequently removed by peeling it away, leaving the PSA substance exposed on the side where the substrate used to be. The newly exposed face of the PSA substance can be applied to a target surface, for example such as a panel or surface, to adhere the composite sound absorber to the target surface.

The entire side (e.g., about 100%) of the side (i.e., the bottom layer) of the acoustic material may be coated with the PSA. If provided in an intermittent PSA coating, depending on the size and spacing of the applied portions of the intermittent PSA coating, the percentage of coated area can be varied. The applied area of the coating can vary between about 10 and about 90%, or more specifically about 30% to about 40%, of the area of the substrate, for example.

The intermittent coating may be applied in strips or in another pattern. This can be achieved by hot-melt coating with a slot die, for example, although it can also be achieved by coating with a patterned roller or a series of solenoid activated narrow slot coating heads, for example, and may also include water and solvent based coatings, in addition to hot-melt coating.

Where the PSA coating is applied in strips, the spacing of the strips may vary depending on the properties of the acoustic material. For example, a lighter acoustic material may need less PSA to hold the material in place. A wider spacing or gap between the strips can facilitate easier removal of the substrate, as a person can more readily find uncoated sections that allow an edge of the substrate to be lifted easily when it is to be peeled away to adhere the sound absorbing material to another surface.

By applying the adhesive in an intermittent pattern, such as longitudinal strips, it is possible to still achieve the coating weight desired for a particular application, while saving a large percentage of the PSA resin by coating only some portions of the total area. Thus, it may be possible to use a reduced amount of PSA substance because the sound absorbing material of certain embodiments is a lightweight and porous article that does not require an all-over coating. Lowering the overall amount of PSA used also has the effect of minimizing the toxic emissions and volatile organic compounds (VOC) contributed by the PSA substance used to adhere the sound absorbing material to a target surface. The described acrylic resin used for the PSA also has relatively low VOC content.

The pressure sensitive adhesive substance may be an acrylic resin that is curable under ultraviolet light, such as AcResin type DS3583 available from BASF of Germany. A PSA substance may be applied to substrate in a thickness of about 10 to about 150 microns, for example. The thickness may alternatively be from about 20 to about 100 microns, and possibly from about 30 to about 75 microns, for example.

Other types of PSA substance and application patterns and thicknesses may be used, as well as PSA substances that can be cured under different conditions, whether as a result of irradiation or another curing method. For example, the PSA substance may comprise a hot-melt synthetic rubber-based adhesive or a UV-curing synthetic rubber-based adhesive.

The finished, assembled acoustic composite, as a result of layering acoustic composite layers, may be a lighter weight and higher performing acoustic composite (e.g., as compared with a denser, heavier, and/or thicker lofted layer, such as those traditionally used). The acoustic composite may have a better value proposition (e.g., performance versus cost) than traditional sound absorption materials. The finished acoustic composite comprises a material whose properties can be adjusted via many methods. Adjustment can be made by the use of one or more materials having a high specific air flow resistance (e.g., AFR scrim layers). Adjustment can be made by altering thickness, density, fiber matrix, chemistry, method of bonding, and the like for each layer of the acoustic composite. It is contemplated that the acoustic composite may have any of the following advantages over other materials traditionally used: better non-acoustic properties, such as better temperature resistance, hydrolytic stability, compression resistance, and mold/mildew resistance (versus foams and natural fiber, for example); better compression resistance and performance stability (versus mineral wool, for example); easier fabrication and installation (versus perforated metal panels, for example); ability to mold over most foams and mineral wools; easier molding and creation of a lower VOC and/or lower toxicity (versus resonated natural fiber and fiberglass type products, for example); improved flexibility and/or softness (versus a honeycomb structure, for example); improved ability to mold into a desired shape (versus a honeycomb structure, for example); improved ability to tune more parameters in the absorption matrix, such as fibers, layers, thickness, and bulk density (versus a honeycomb structure, for example); higher thicknesses at lower weights or densities (versus honeycomb structures or bulk absorption layers formed by air laying, for example).

Figure 1:
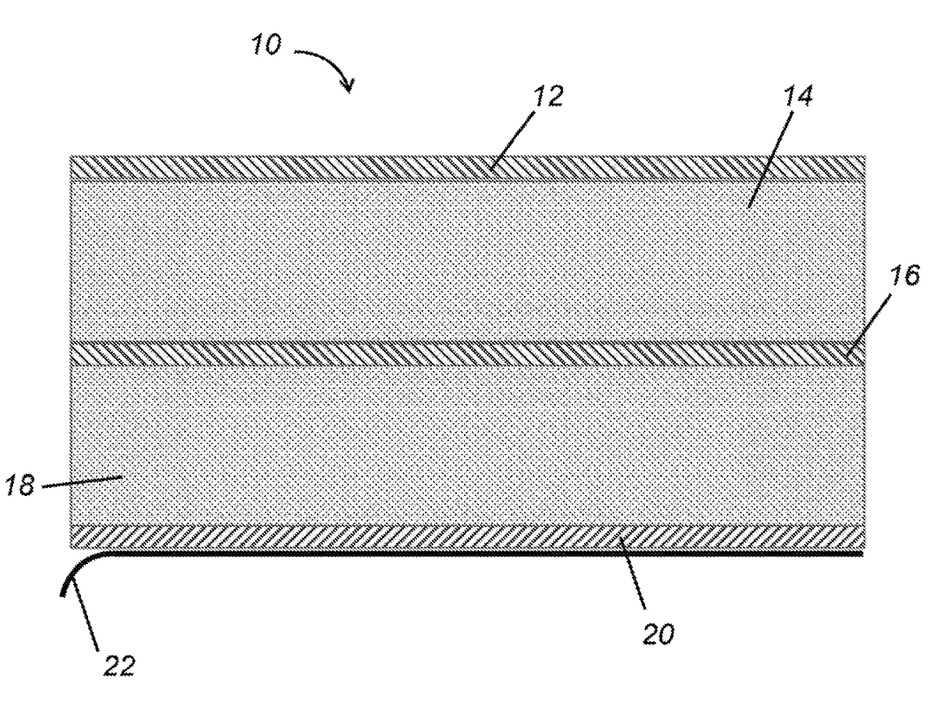
FIG. 1 is a cross-sectional view of a multi-impedance acoustic composite in accordance with the present teachings.

FIG. 1 illustrates a cross-sectional view of a multi-impedance acoustic composite 10 having multiple layers. A top layer 12 is attached to a side of a first lofted layer 14. The top layer 12 has a specific air flow resistance that is greater than the specific air flow resistance of the first lofted layer 14 to create a multi-impedance acoustic mismatched profile through the composite. A side of the first lofted layer 14 opposite the top layer 12 is attached to a middle layer 16. The middle layer 16 has a higher air flow resistance than the first lofted layer 14, enhancing the multi-impedance acoustic mismatched profile. The multi-impedance acoustic composite 10 includes a second lofted layer 18 attached to the opposing side of the middle layer 16 so that the middle layer 16 is sandwiched between the first lofted layer 14 and the second lofted layer 18. A pressure sensitive adhesive 20 is located on the opposing side of the second lofted layer 18. The pressure sensitive adhesive 20 includes a release liner 22, which allows a user to peel the release liner 22 away and adhere the multi-impedance acoustic composite 10 to a substrate (not shown).

While FIG. 1 illustrates a four-layered acoustic composite, the present teachings also contemplate a composite having fewer than four layers (e.g., a dual-layered system or a three layered system) or a composite having greater than four layers (e.g., a five-layered system, a six-layered system, or more) formed by adding additional lofted layers, additional layers having high specific air flow resistances, or another type of material, such as a material that provides acoustic absorption. While the FIGURE illustrates an alternating layered system (e.g., with lofted layers sandwiched between other higher air flow resistive layers), it is contemplated that other configurations are possible. For example, two or more high air flow resistive layers may be located directly adjacent to each other. Two or more lofted layers may be located directly adjacent to each other.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01, or 0.1 as appropriate. These are only examples of what is specifically intended and all possible combinations of numerical values between the lowest value, and the highest value enumerated are to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. An acoustic composite consisting of:
   a. an outermost top layer having a specific air flow resistance of about 301 mks Rayls to about 10,000 mks Rayls;
   b. a middle layer having a specific air flow resistance of about 301 mks Rayls to about 10,000 mks Rayls;
   c. a first low density acoustic composite material consisting of a first vertically lapped nonwoven layer sandwiched between the outermost top layer and the middle layer, the first vertically lapped nonwoven layer having a lower specific air flow resistance than the outermost top layer and the middle layer, wherein the first low density acoustic composite material has a thickness of about 12 mm or greater and about 60 mm or less and a weight of about 50 g/m$^2$ or greater and about 250 g/m$^2$ or less; and
   d. a second low density acoustic composite material consisting of a second vertically lapped nonwoven layer attached to the middle layer opposite the first vertically lapped nonwoven layer, the second vertically lapped nonwoven layer having a lower specific air flow resistance than the outermost top layer and the middle layer, wherein the second low density acoustic composite material has a thickness of about 12 mm or greater and about 60 mm or less and a weight of about 50 g/m$^2$ or greater and about 250 g/m$^2$ or less;
   wherein the acoustic composite as a whole exhibits greater sound absorption than the summation of performance of the layers individually; and
   wherein the outermost top layer and the middle layer each have a thickness that is less than the thickness of the first vertically lapped nonwoven layer and the second vertically lapped nonwoven layer.

2. The acoustic composite of claim 1, wherein the outermost top layer is a fibrous scrim, a film, or a foil; and wherein the middle layer is a fibrous scrim, a film, or a foil.

3. The acoustic composite of claim 2, wherein the outermost top layer and the middle layer are nonwoven or woven fibrous scrim layers.

4. The acoustic composite of claim 2, wherein the outermost top layer and the middle layer are perforated films.

5. The acoustic composite of claim 1, wherein the first and second vertically lapped nonwoven layers have different specific air flow resistances.

6. The acoustic composite of claim 1, wherein the outermost top layer has a different specific air flow resistance than the middle layer.

7. The acoustic composite of claim 1, wherein the acoustic composite has a total thickness of up to about 155 mm.

8. The acoustic composite of claim 1, wherein two or more layers are bonded together by one or more lamination processes.

9. The acoustic composite of claim 1, wherein the outermost top layer is a fibrous scrim, a film, or a foil.

10. The acoustic composite of claim 9, wherein the outermost top layer is a nonwoven or woven fibrous scrim layer.

11. The acoustic composite of claim 9, wherein the outermost top layer is a perforated film.

12. The acoustic composite of claim 1, wherein the middle layer is a fibrous scrim, a film, or a foil.

13. The acoustic composite of claim 12, wherein the middle layer is a nonwoven or woven fibrous scrim layer.

14. The acoustic composite of claim 12, wherein the middle layer is a perforated film.

15. An acoustic composite consisting of:
    a. an outermost top layer having a specific air flow resistance wherein the specific air flow resistance of the outermost top layer is about 301 mks Rayls to about 10,000 mks Rayls;
    b. a middle layer having a specific air flow resistance of about 301 mks Rayls to about 10,000 mks Rayls;
    c. a first low density acoustic composite material consisting of a first vertically lapped nonwoven layer sandwiched between the outermost top layer and the middle layer, the first vertically lapped nonwoven layer having a lower specific air flow resistance than the outermost top layer and the middle layer, wherein the first low density acoustic composite material has a thickness of about 12 mm or greater and about 60 mm or less and a weight of about 50 g/m$^2$ or greater and about 250 g/m$^2$ or less; and
    d. a second low density acoustic composite material consisting of a second vertically lapped nonwoven layer attached to the middle layer opposite the first vertically lapped nonwoven layer, the second vertically lapped nonwoven layer having a lower specific air flow resistance than the outermost top layer and the middle layer, wherein the second low density acoustic composite material has a thickness of about 12 mm or greater and about 60 mm or less and a weight of about 50 g/m$^2$ or greater and about 250 g/m$^2$ or less; and
    e. an additional layer, where the second low density acoustic composite material is sandwiched between the middle layer and the additional layer;
    wherein the acoustic composite as a whole exhibits greater sound absorption than the summation of performance of the layers individually; and
    wherein the outermost top layer and the middle layer each have a thickness that is less than the thickness of the first vertically lapped nonwoven layer and the second vertically lapped nonwoven layer.

16. The acoustic composite of claim 15, wherein the additional layer has a greater specific air flow resistance than the second low density acoustic composite material.

17. The acoustic composite of claim 15, wherein the additional layer is a pressure sensitive adhesive for adhering the acoustic composite to a substrate.

18. The acoustic composite of claim 15, wherein the outermost top layer is a fibrous scrim, a film, or a foil; and wherein the middle layer is a fibrous scrim, a film, or a foil.

19. The acoustic composite of claim 15, wherein the outermost top layer is a nonwoven or woven fibrous scrim layer.

20. The acoustic composite of claim 15, wherein the middle layer is a nonwoven or woven fibrous scrim layer.

* * * * *